United States Patent
Koch

(10) Patent No.: US 8,413,311 B2
(45) Date of Patent: Apr. 9, 2013

(54) DEVICE FOR CONNECTING A STRING SECTION WITH A PULLING ELEMENT WHICH EXTENDS THROUGH THE STRING SECTION, AND METHOD FOR TENSIONING OF STRING SECTIONS TO FORM A STRING

(75) Inventor: Elmar Koch, Eslohe (DE)

(73) Assignee: Tracto-Technik GmbH & Co. KG, Lennestadt (DE)

( * ) Notice: Subject to any disclaimer, the term of this patent is extended or adjusted under 35 U.S.C. 154(b) by 0 days.

(21) Appl. No.: 12/293,177

(22) PCT Filed: Jul. 10, 2007

(86) PCT No.: PCT/EP2007/006115
§ 371 (c)(1),
(2), (4) Date: Sep. 16, 2008

(87) PCT Pub. No.: WO2008/011982
PCT Pub. Date: Jan. 31, 2008

(65) Prior Publication Data
US 2011/0239434 A1  Oct. 6, 2011

(30) Foreign Application Priority Data
Jul. 24, 2006  (DE) .............. 20 2006 011 507 U

(51) Int. Cl.
*B23P 19/04* (2006.01)
(52) U.S. Cl.
USPC ............... 29/433; 29/781; 29/244; 254/29 R; 405/154.1
(58) Field of Classification Search ............... 29/402.01, 29/433, 779, 781, 234, 238, 253, 252, 244; 138/97, 155; 254/29 R; 405/154.1, 169, 405/170, 183.5, 184, 184.1, 184.4, 184.5
See application file for complete search history.

(56) References Cited

U.S. PATENT DOCUMENTS

| 3,599,315 | A | * | 8/1971 | Pizzagalli ..................... 405/184 |
| 3,699,635 | A | * | 10/1972 | Bradley et al. .................. 29/252 |
| 4,053,973 | A | * | 10/1977 | Meli ............................... 29/252 |
| 4,322,182 | A | * | 3/1982 | Ostgaard ...................... 405/227 |
| 4,674,914 | A | * | 6/1987 | Wayman et al. ........... 405/184.3 |
| 6,539,599 | B2 | * | 4/2003 | Martin et al. ................... 29/235 |
| 6,571,447 | B1 | * | 6/2003 | Martin ............................ 29/235 |

FOREIGN PATENT DOCUMENTS

| DE | 196 08 056 C1 | 10/1997 |
| DE | 101 61 648 A1 | 6/2003 |
| DE | 10 2004 033 566 | 10/2005 |
| EP | 0 694 675 A1 | 1/1996 |

* cited by examiner

Primary Examiner — David Bryant
Assistant Examiner — Christopher Koehler
(74) *Attorney, Agent, or Firm* — Henry M. Feiereisen LLC

(57) ABSTRACT

The invention relates to a device for connecting a string section to a pulling element which extends through the string section. The device includes a tilt lever support (100), at least one tilt lever (102), which is connected to the tilt lever support so as to enable the tilt lever to pivot about a pivot point, and thereby moving a support part (105) of the tilt lever for support on the string section from a retracted position into an extended position, wherein the retracted position is closer to the center axis of the device than the extended position. The device further includes a connection for connecting the tilt lever support to the pulling element.

17 Claims, 4 Drawing Sheets

DEVICE FOR CONNECTING A STRING SECTION WITH A PULLING ELEMENT WHICH EXTENDS THROUGH THE STRING SECTION, AND METHOD FOR TENSIONING OF STRING SECTIONS TO FORM A STRING

BACKGROUND OF THE INVENTION

The invention is directed to connecting a string section with a pulling element, which extends through the string section, and to bracing string sections, in particular pipe sections, to form a string with a pulling element arranged between a counter support at a front end of the pipe string and an adaptor at a rear end thereof.

Corresponding systems are frequently used in trenchless pipe installation or renewal, for example, to brace the pipe string made of individual pipe sections and to connect the pipe string with a leading drilling or bursting tool with the least possible play.

Such system is described, for example, in DE 196 08 056 C1.

This document discloses a bursting tool which is pulled through an old pipe to be replaced. When the bursting tool advances through the old pipe, the old pipe is destroyed and a new pipe string is simultaneously pulled through the ground. The new pipe string to be pulled in includes individual short pipe sections.

To reduce friction during the pulling process, the pipe sections of the new pipe string have connecting sleeves with smooth outer and inner surfaces. However, these connecting sleeves are incapable of transmitting pulling forces, so that a tensioning device is provided for connecting the pipe string with the bursting tool with the least possible play.

The tensioning device acts on a cable or a chain which is secured to the bursting tool and routed through the pipe to be newly drawn-in.

The actual tensioning device, which is supported on the rear end of the last pipe section by an adapter, is located at the rear end of the pipe string.

The cable or chain is tensioned by means of hydraulic cylinders which are arranged perpendicular to the cable or the chain to account for the tight work space in the work shafts. The cable or the chain is hereby deflected by a freewheeling deflection pulley in the longitudinal direction of the hydraulic cylinders. The freewheel of the deflection pulley prevents the tensioned cable or the tensioned chain from rebounding, if several cylinder strokes are required for a complete tensioning operation.

The tensioning device described in DE 196 08 056 C1 has several disadvantages.

The deflection required by the perpendicular arrangement of the cylinders necessitates the use of flexible chains or cables as pulling member which undergo, however, a significant elongation, when subjected to high tension forces, which must be compensated by the tensioning device. This is disadvantageous, in particular, because the tensioning device must be released each time a new pipe section is added, so that at each tensioning cycle the expanded pulling member is unloaded and then again loaded.

Another disadvantage of the afore-described tensioning device is the considerable space requirement, in particular inside a reversing shaft, which is frequently used to start the operations to replace old pipes.

Tensioning devices, which use a cable or a chain as pulling member, have the additional disadvantage that the cable or the chain must typically have at least the same length as the overall length of the pipe string to be pulled in. In particular, at the start of the pipe replacement process, the pipe sections must be threaded onto the pulling member over a considerable distance.

DE 10 2004 033 566 B3 describes a device for bracing pipe sections with a pulling element to form a pipe string, wherein the device extends between a counter support at the front end of the pipe string and an adapter located at the rear end of the pipe string, and includes a linear tensioning drive for applying the tensioning force. The system is characterized by the parallel disposition of the linear tensioning drive in relation to the pipe string, wherein one side of the linear tensioning drive is supported on the adapter, while the other side is supported via at least one restraining element on the pulling element.

In this way, the linear tensioning drive can be arranged in part also inside the pipe string to be installed, thereby reducing the space requirement for the tensioning device.

However, to add a new pipe section to the pipe string, the tensioning device must be moved on the pulling element or released from the pulling element. This operation is executed by hand heretofore.

SUMMARY OF THE INVENTION

It is an object of the invention to propose a device for connecting a string section with a pulling element extending through the string section, to allow, for example, easy movement or removal of the conventional tensioning device on or from the pulling element.

This object is attained in accordance with one aspect of the invention by a device for connecting a string section with a pulling element extending through the string section, which includes a tilt lever support, at least one tilt lever which is connected to the tilt lever support such that the tilt lever can pivot about a pivot point, thereby enabling a support part of the tilt lever formed for providing support on the string section to move from a retracted position into an extended position, wherein the retracted position is located closer to the center axis of the device in relation to the extended position, and a connection for connecting the tilt lever support (100) with the pulling element.

According to another aspect of the invention, a device for bracing string sections to form a string includes a pulling element, which extends between a counter support and an adapter disposed at the rearward end of the string, and a linear tensioning drive arranged in parallel in relation to the pipe string for applying a tensioning force, and a friction brake which self-lockingly engages the pulling element in an operating position in response to only a pulling load applied by the tensioning drive so as to allow automatic movement of the tensioning device in a direction toward the pulling element, wherein the adapter, the tensioning drive and the friction brake are formed by a device for connecting a string section with the pulling element.

According to another aspect of the invention, a method of bracing string sections to form a string includes the following steps: attaching a pulling element to a counter support arranged at a front end of the string, threading one or several string sections to form a string on the pulling element; connecting a device for connecting a string section with a pulling element, which comprises a tilt lever support, at least one tilt lever which is connected with the tilt lever support in such a way that the tilt lever can pivot about a pivot point, so that a support part of the tilt lever, which is formed to support the tilt lever on the string section, can move from a retracted position to an extended position, wherein the retracted position is arranged closer to the center axis of the device than the extended position, and a tensioning drive, so that the support part of the tilt lever is supported on the rear end of the last string section, and the tensioning drive is supported on the pulling element by a support element, activating the tensioning drive, whereby the tilt lever support and the tilt lever move relative to the support element; activating the friction brake and retracting the tensioning device from the string.

The invention is based on the concept to use in the connection with the pulling element at least one tilt lever as an adapter which is supported on a tilt lever support. The tilt position of the tilt lever can be changed relative to the tilt lever support, so that a support segment on the tilt lever can be moved into different positions and hence used as an adapter which can be adapted to different cross sections. By using a tilt lever, the connecting device can be easily pulled through the string section when the tilt lever is pivoted into a retracted position.

The tilt lever support and the tilt lever are constructed so that the tilt lever is connected with the tilt lever support in such a way that the tilt lever can pivot about a pivot point and a support part of the tilt lever formed for providing support on the string section can be moved from a retracted position into an extended position, wherein the retracted position is located closer to the center axis of the device in relation to the extended position.

By using the tilt levers, the device of the invention establishes a connection to the string section which transfers thrust forces or pulling forces. A connection for connecting the tilt lever support with the pulling element is also provided on the device of the invention, thereby establishing a connection with the pulling element (on the other side), so that the device of the invention can connect the string section with the pulling element for force-transmission.

In a preferred embodiment, the tilt lever support is configured as a ring. The device of the invention is particularly preferred with string sections having a circular or elliptical inside diameter. A ring-shaped configuration of the tilt lever support has proven to be particularly suited for uniformly introducing the forces across the cross-section of the string section.

In a preferred embodiment, the support part of the tilt lever is formed on an end of the tilt lever. If the tilt lever has a bent periphery, the support part may also be arranged, for example, near the bend, for example as a non-positive connection. The forces are transmitted particularly efficiently if the support part is arranged at the end of the tilt lever and cooperates, for example, in positive-locking engagement with the inside of a sleeve at the end of the string section.

Particularly preferred, the support part is oriented perpendicular to the tilt plane in which the tilt lever can move. Advantageously, the contact surface transmitting the forces between the tilt lever and the string section should be as large as possible. This is attained, for example, by a support part formed perpendicular to the tilt plane.

In a particularly preferred embodiment, several tilt levers are provided. For example, with this arrangement the thrust forces can be introduced into the string section in a symmetric fashion.

Particularly preferred, the support surfaces of these tilt levers are formed perpendicular to the tilt plane and together form an at least almost complete annular surface. Ideally, this annular surface is interrupted only by thin gaps between the various adjacent support surfaces configured as a ring.

In a preferred embodiment, the tilt lever is biased by elastic means in the direction of the extended position. Preferably, the tilt lever contacts a projection or a shoulder of the string section from the inside. This engagement with the string section during insertion of the device of the invention is attained more quickly and without special adjustment and installation steps by biasing the tilt lever in the direction of an extended position.

A particularly good bias in the direction of an extended position is achieved by providing several tilt levers, wherein each of the tilt levers has a segment opposite the corresponding support part in relation to the corresponding pivot point, and an O-ring making contact with these segments. The O-ring pulls these segments (which are preferably arranged at the ends) together and thereby biases the opposing support parts into an extended position.

According to a preferred embodiment, a limit stop is provided which limits movement of the tilt lever from the retracted position to a maximum extended position by having a portion of the tilt lever contacting the limit stop. Limiting the tilt motion of the tilt lever improves handling of the device of the invention and prevents the tilt lever from rotating beyond a defined point or from ultimately flipping over.

In a preferred embodiment, a tensioning drive is provided for connecting the tilt lever support with the pulling element, wherein one end of the tensioning drive is connected with the tilt lever support and the other end of the tensioning drive can be connected with the pulling element. Alternatively, the tilt lever support can be directly connected with the pulling element, for example by way of a sleeve or a bolt engaging with the sleeve and the pulling element. In a particularly preferred application, where string sections are used with the method of the invention, it has proven to be particularly advantageous if the distance between the tilt lever and the connection point (support element) with the pulling element can be changed, for example, actively changed with a tensioning drive.

A tensioning device of the invention includes the afore-described connection device according to the invention with a friction brake which engages with the pulling element to self-lock in one direction. In this operating position, the self-locking feature, which causes the pulling element to be affixed to the friction brake, is effective only in one direction and is initiated and maintained by the tension force of the tensioning drive (preferably when the tensioning drive contracts), so as to enable automatic movement of the tensioning drive or the tensioning device in this direction toward the pulling element. The tensioning drive or the tensioning device can be pulled out of the respective pipe section with the aid of the friction brake. This obviates the need for manually pulling the tensioning drive or the tensioning device out. For threading the tensioning device onto the pulling element, the friction brake can be switched into a freewheeling position.

"Friction brake" refers in particular to any geometric configuration of an attachment means which can move on or at the pulling element as needed and which can be implemented, for example, as a slide bush or slide shoe, i.e., as attachment means configured without a completely closed ring.

The friction brake according to the invention can be configured, for example, as a tube or can have a locking ring through which the pulling element extends. The locking ring can be arranged in the friction brake so that it can be moved by an operating lever into an inclined position relative to the pulling element, whereby a self-lock is established on the pulling element as soon as the friction brake is moved in a direction toward the pulling element. When the operating lever is released, the friction brake can again move freely on the pulling element.

"Linear tensioning drive" refers to a drive assembly which can produce a relative movement between two connected points of articulation along a working line. In particular, hydraulically or pneumatically operated cylinders can be used, with the cylinder wall moving relative and linear in relation to the piston rod. Another example for such linear drive is a combination of a rotary motor and a gear rack. One point of articulation for supporting the force is hereby located on the rotary motor and the other point of articulation on the gear rack. A threaded rod can also be used as a linear tensioning drive.

The solution according to the invention is not limited to tensioning of circumferentially enclosed pipe sections. Instead, any type of elements can be tensioned which, when arranged consecutively, form a string through which or on which a pulling element can be guided.

The linear tensioning drive can be supported on the adapter or the pulling element (by way of the support element(s)) either directly or indirectly via intermediate elements.

In the context of the invention, the term "sleeve" is to be understood as to include any element which can be connected to the pulling element and thereby transfer forces, at least in a longitudinal direction of the pulling element as well as transversely thereto. In particular, the sleeve in the context of the invention can also have a square, V-shaped or U-shaped cross-section.

The device of the invention can be used particularly advantageously to tension a string composed of individual pipe sections on a pulling device designed for trenchless pulling of pipes. Included herein are statically and/or dynamically advancing, expanding, bursting or drilling devices, which can be either self-driven or externally driven.

The tensioning device of the invention can be used with any type of counter support which enables attachment of a pulling element and provides support for the front end of the pipe string.

In a preferred embodiment of the invention, the pulling element is constructed as a rod linkage composed of individual rod sections. This makes it possible to adapt the length of the pulling element when the new pipe is pulled through, since the length of the new pipe steadily increases when individual pipe sections are added. Threading new pipe sections onto the free end of the pulling element then also becomes less complex.

Using a rod linkage also has the advantage that by suitably selecting the shape and material, the expansion of the linkage can be kept small enough so that it does not noticeably affect the tensioning operation.

Another advantage when using a rod linkage as a pulling element is that design features, which ensure a positive-locking connection with elements of the tensioning device, can be easily integrated. Advantageously, a positive-locking connection with a bending-resistant rod linkage is also possible. It is particularly advantageous if the rod sections forming the pulling element have one or more openings or protrusions which can provide a positive-lock with the support element of the tensioning drive or the sleeve.

"Openings" or "protrusions" refer to those structural features which enable a positively locking connection. In particular, breakouts or blind holes in the linkage elements should be mentioned. In addition, grooves of any shape may be provided. Protrusions include in particular all raised portions which result in a positive-lock by contacting an edge of the sleeve.

Particularly advantageously, the openings or protrusions are uniformly spaced on the rod sections.

In an advantageous embodiment of the present invention, the tensioning drive includes one or more pneumatically or hydraulically driven cylinders, wherein the first end of the cylinder(s)—for example the cylinder wall—is supported on the adapter, and the second end—in the present example the piston rod—is supported on the sleeve with a positive-locking and/on non-positive connection.

The drive cylinder(s) may be ring-shaped, wherein the cylinder wall and/or the cylinder piston can have an opening along the longitudinal axis, through which the pulling element and other elements of the tensioning device can be guided.

In an advantageous embodiment, the tensioning device includes a segment with an outside diameter that matches to or can match the inside diameter of the pipe sections. In this way, the pulling element and the tensioning device can be centered inside the pipe string. The diameter of this segment can also be matched, for example, by applying different adapters. Advantageously, the diameter matched to the pipe adapter can be located on one side and the support elements on the corresponding opposing side.

The method of the invention for tensioning string sections (1) to form a pipe string with the following steps:

Attaching a pulling element to a counter support arranged at a front end of the string;

Threading one or several string sections (1) on the pulling element;

Applying a device for connecting a string section with a pulling element, which has a tilt lever support, at least one tilt lever which is connected with the filter lever support in such a way that the tilt lever can pivot about a pivot point, whereby a support part of the tilt lever formed to provide support on the string section can be moved from a retracted position to an extended position, wherein the retracted position is located closer to the center axis of the device than the extended position, and a tensioning drive, so that the tilt lever is supported with its support part on the rear end of the last string section, and the tensioning drive is supported by a support element on the pulling element;

Activating the tensioning drive, whereby the tilt lever support and the tilt lever are moved relative to the support element (6);

Activating the friction brake (20) and withdrawing the tensioning device from the string.

When tensioning cylinders with a short stroke are advantageously used for the tensioning device, a tensioning operation for the pipe string may include several tensioning cycles of the tensioning device.

For example, for applying the tensioning force, the tensioning device of the invention can be attached to the string at the end of the last string section in opposition to the counter support, whereby the tilt levers can engage with the end portion of an inside of a sleeve, and the tensioning drive providing the connection to the pulling element can be connected with an opening of the pulling element via a sleeve and an associated bolt. When the tensioning drive is tensioned, i.e., when the tilt levers and the connecting point on the pulling element are moved away from each other, thrust forces are transferred to the string section, thereby moving and/or biasing the string section in the direction of the counter support.

With this movement, the respective one end of a string section can be inserted into the sleeve of an adjacent string section. The force bias holds the telescoping sections of pipe together when the string is pulled farther into the ground by an additional pulling means which engages on the counter support from the outside, for example on an expansion head. In this way, the string located behind the counter support can be reliably pulled in the ground, without pulling the string sections apart.

If the string is to be elongated after the first pulling operation, then a new string section can be attached to the last section facing the counter support and—if the pulling means is implemented as a rod linkage—an additional rod section can be connected to the end of the pulling means. The locking bolt can then be removed from the sleeve. The tensioning drive can be further retracted, whereby the connecting device still is supported via the tilt lever on the end of the (now next to last) string section, so that the end of the tensioning section facing the tilt levers is moved by the tilt levers. The friction brake then moves over the linkage. After the tensioning drive is completely retracted, the drive is switched and is again inserted. The friction brake now locks on the linkage and prevents a return motion of the end of the tensioning drive facing the tilt levers. Accordingly, the contraction of the tensioning drive effectively pulls the tilt levers towards the friction brake. They then adapt to the inside diameter of the new string section and optionally pivot into a farther retracted position.

While the tensioning drive and the tilt levers are pulled in to the new string section, the tilt levers are continuously biased by the circumferential O-ring. When the tilt levers reach the next sleeve, they tilt into a farther raised position in that sleeve. The tensioning drive with the locking bolt and the tensioning sleeve can now be again connected with the pulling element and the string sections can be tensioned again.

In a preferred embodiment, the tilt lever support and the tilt levers are arranged in the thrust direction so that the tilt lever support is located in front of the tilt levers, meaning that the tilt levers are moved from the outside to a projection of the string section by the tilt lever support located on the outside. In this way, the thrust forces are particularly reliably applied. If the tilt levers are moved to the projection from the inside by a tilt lever support located on the inside, then there is a risk that the tilt levers may be pressed inwardly when the pulling forces are transferred and lose contact with the string section. Although this arrangement is also proposed in the context of the present invention, the solution where thrust forces are transferred is particularly preferred.

BRIEF DESCRIPTION OF THE DRAWING

An exemplary embodiment of the invention illustrated in the drawings will now be described in more detail.

The drawings show in.

DETAILED DESCRIPTION OF PREFERRED EMBODIMENTS

Figure 1:
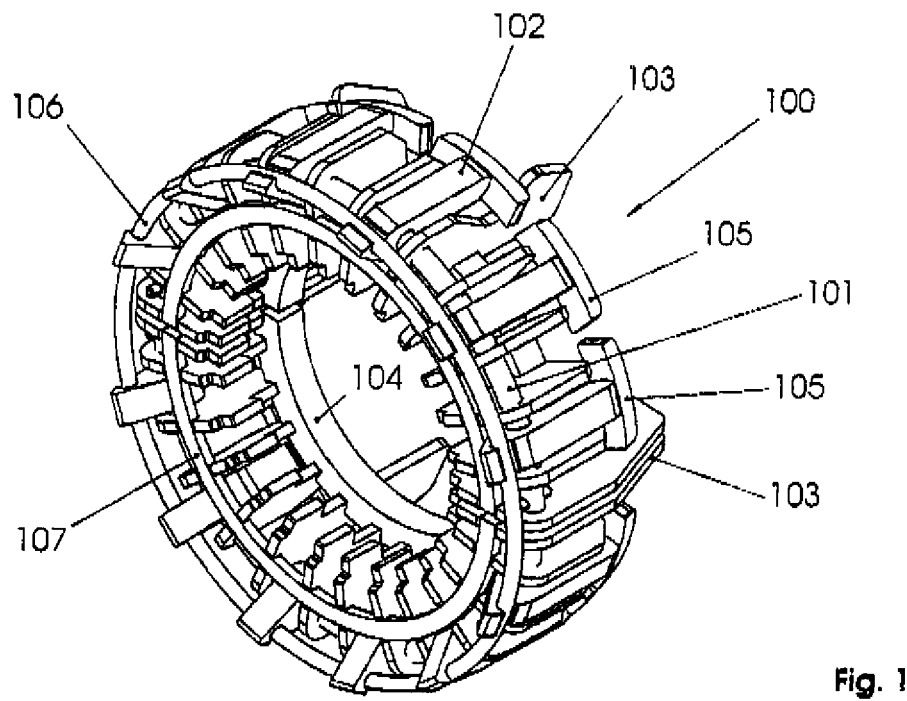
FIG. 1 an embodiment of the tilt lever support and the tilt levers of the device of the invention in a perspective top view, FIG. 2 a side view of the tilt lever support and the tilt levers of FIG. 1, FIG. 3 the tensioning device of the invention in a first position in a string, depicted in a perspective view, FIG. 4 the tensioning device of FIG. 3 in a second position, depicted in a perspective view from a different viewing angle, FIG. 5 a preferred embodiment of the friction brake of the invention, and FIG. 6 the friction brake of FIG. 5 in an operating position.
Figure 2:
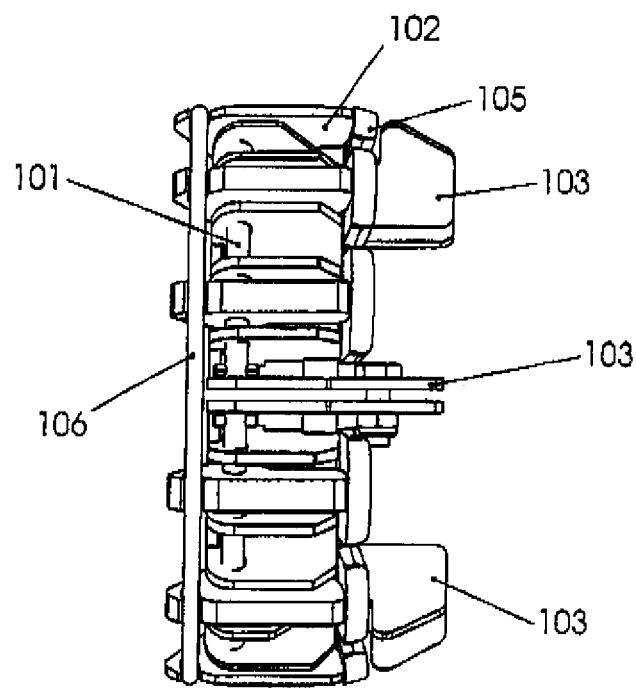

The tilt lever support 100 illustrated in FIG. 1 and FIG. 2 is formed as a ring. The tilt levers 102 are pivotally supported on a ring 101. Also supported on the ring 101 are guiding elements 103. An inner ring 104 is provided for connecting the tilt lever support 100 with means for connecting the tilt lever support 100 with a pulling element extending through the ring 104.

Support parts 105 which are oriented perpendicular to the tilt plane in which the tilt lever is movable are disposed at a first end of the tilt levers 102. At the opposing end, the tilt levers 102 have a seat contacting an O-ring 106 which biases the tilt levers in the direction of the extended position. A stop ring 107 limits the maximum extended position of the tilt levers 102.

Figure 3:
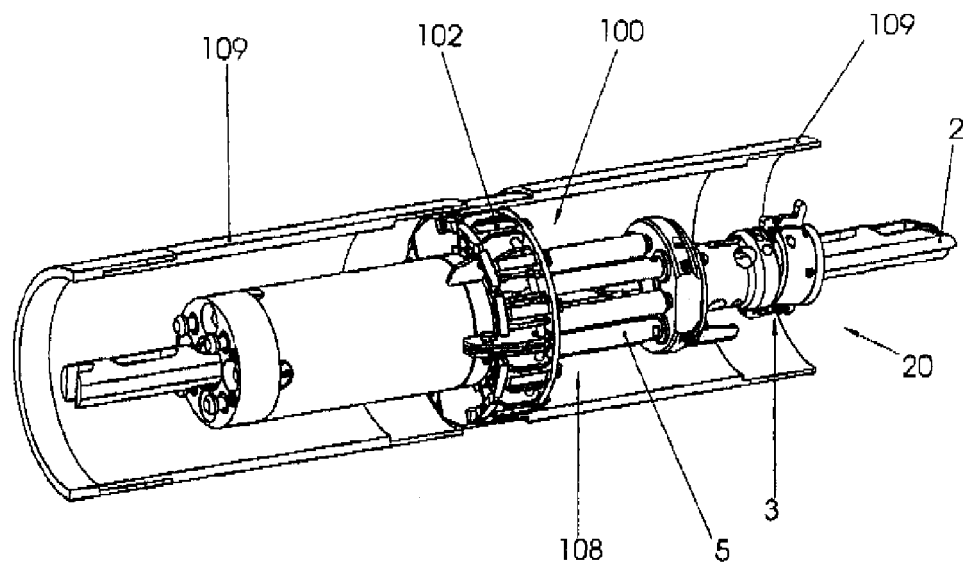
Figure 4:
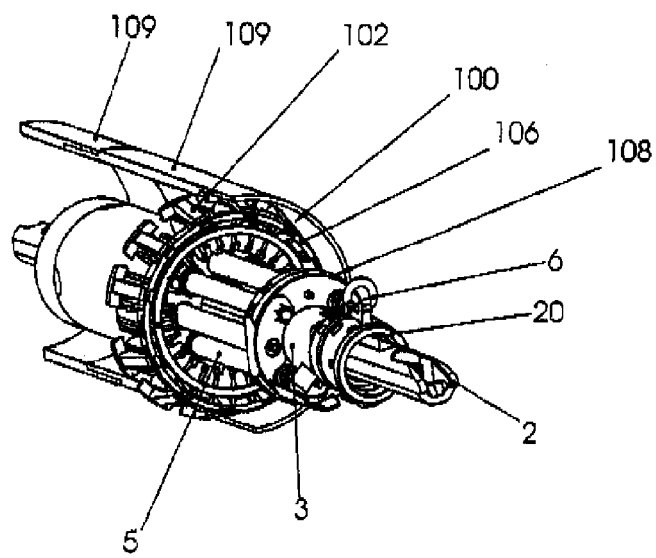
Figure 5:
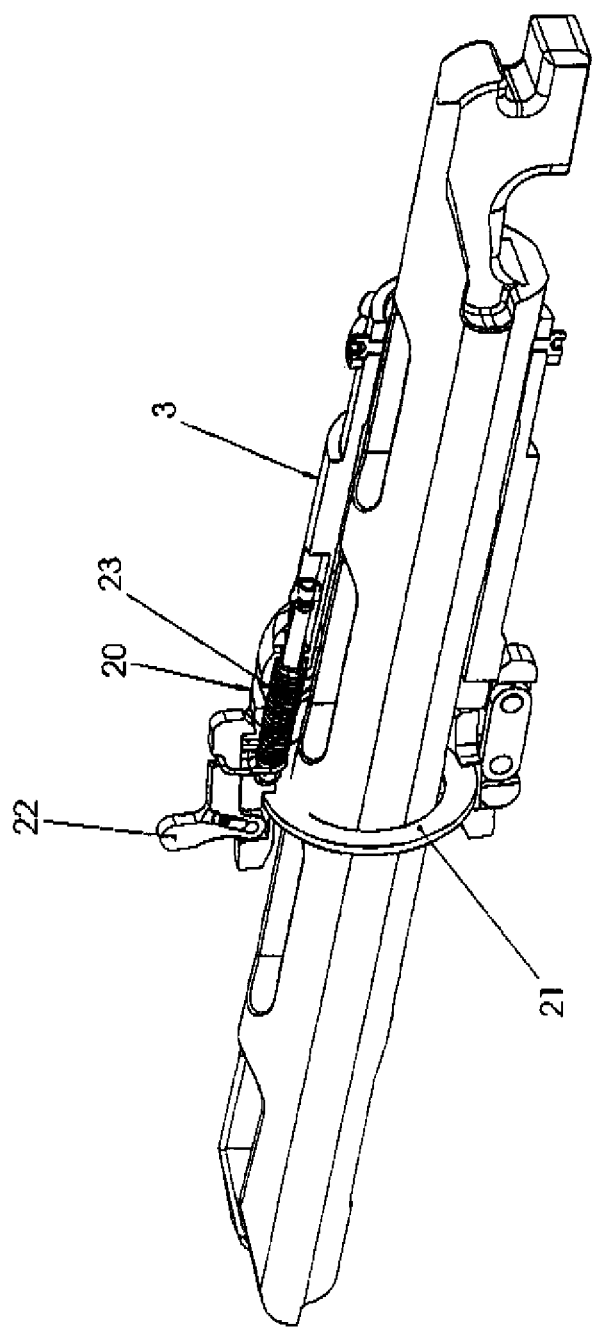
Figure 6:
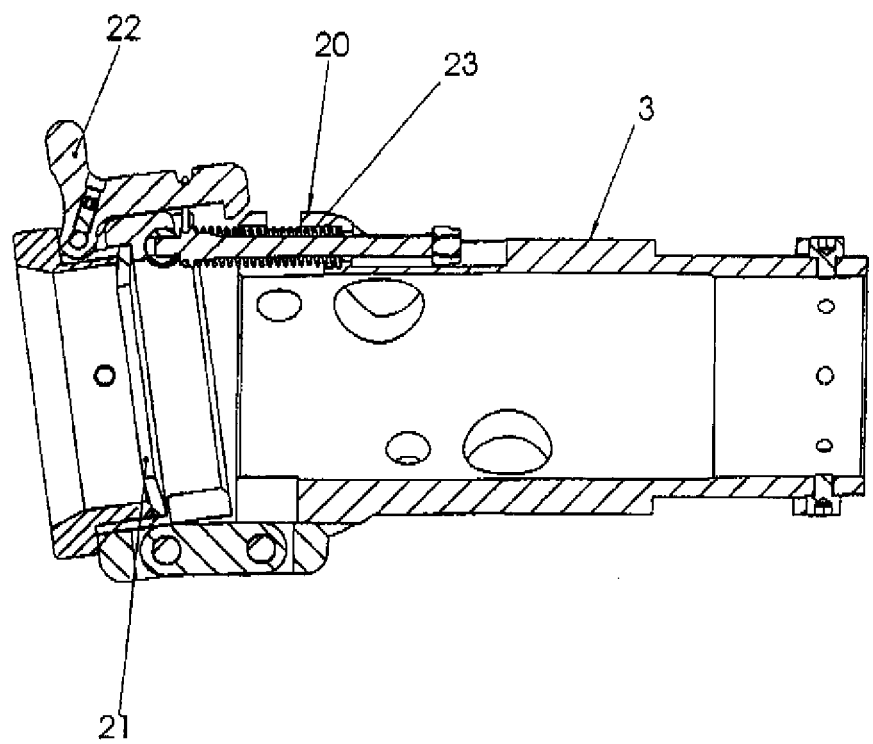
Figure 6:
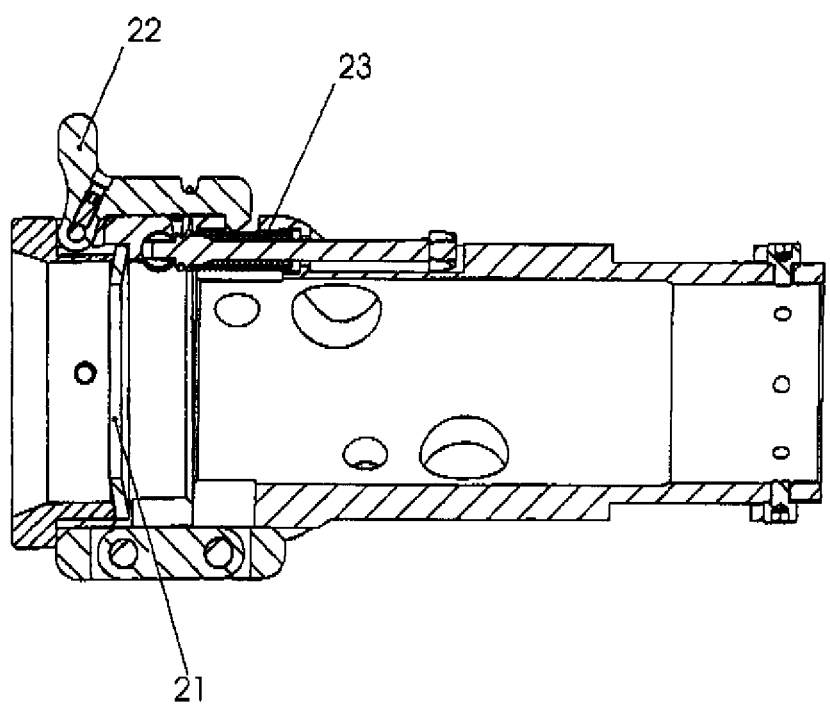

FIG. 3 and FIG. 4 shows the device of the invention for connecting a string section 109 with a pulling element (pulling linkage 2), or tensioning drive of the invention. The device of the invention includes a friction brake 20 and a locking sleeve, as well as the tilt levers 102, the tilt lever support 100 and the tensioning drive 108, which forms a connection to the pulling element (pulling linkage 2).

FIG. 3 shows the device of the invention in a position, where the string is to be elongated following the first pulling operation. A new string section 109 was connected on the last string section 109 facing the counter support, and an additional rod section was connected to the end of the pulling means. The locking bolt 6 was removed from the sleeve 3. The tensioning drive 108 was extended further, whereby the connecting device was still supported via the tilt levers 102 on the end of the (now next to last) string section 109, so that the end of the tensioning drive facing the tilt levers 102 was moved by the tilt levers 102. The friction brake 20 moved here over the linkage 2. After the tensioning drive 108 was completely extended, the drive was switched and the tensioning drive 108 is now again retracted. The friction brake 20 now locks on the linkage 2 and prevents a reverse movement of the end of the tensioning drive 108 facing the tilt levers 102. The contraction of the tensioning drive 108 has the effect that the tilt levers 102 are pulled towards the friction brake. They then adapt (as shown in FIG. 3) to the inside diameter of the new string section 109 and tilt into a farther retracted position.

While the tensioning drive 108 and the tilt levers 102 are pulled into the new string section, the tilt levers 102 are continuously biased by the circumferential O-ring 106. When the tilt levers 102 reach the next sleeve—as illustrated in FIG. 4—, they pivot into a farther extended position in this sleeve. The tensioning drive 102 with the locking bolt 6 and the tensioning sleeve 3 can now be again connected with the pulling element 2 and the string sections 109 can be tensioned again. Tensioning has also the effect that the last pipe is inserted into the sleeve of the next to last pipe, as evident from a comparison of FIG. 3 and FIG. 4.

The tensioning device is used to tension individual pipe sections 109, which are threaded on a pulling linkage 2, on a pulling device for pipes (not shown), wherein the friction brake 20 of the invention enables the tensioning device to automatically move out of the tensioned pipe section 109.

The tensioning device includes essentially a locking sleeve 3 with an upstream friction brake 20 and of a unit with an adapter movable thereto, and several hydraulic cylinders 5.

The friction brake 20 has a tubular structure with a locking ring 21 supported on the inside. The pulling element 2 extends through the friction brake and the locking ring 21. The locking ring 21 can be released with an operating lever 22 and is then tilted by a spring 23. Tilting of the locking ring 21 has the effect that the locking ring is wedged on the pulling element 2 under a pulling force supplied by the tensioning drive 108 of the tensioning device, whereas a thrust force applied by the tensioning drive 108 moves the friction brake 20 on the pulling element 2. In this way, the tensioning device can be pulled out of the pipe string step-by-step.

What is claimed is:

1. A device for connecting a string section with a pulling element extending through the string section, comprising:

a tilt lever support,
at least one tilt lever which is connected to the tilt lever support for pivoting about a pivot point, the at least one tilt lever having a support part configured for supporting the at least one tilt lever on the string section for movement from a retracted position to an extended position, wherein the retracted position is located closer to a center axis of the device than the extended position,
elastic means for biasing the tilt lever toward the extended position, and
a connection for connecting the tilt lever support with the pulling element.

2. The device of claim 1, wherein the tilt lever support is formed as a ring.

3. The device of claim 1, wherein the support part of the at least one tilt lever is formed on an end of the tilt lever and includes a support surface oriented perpendicular to a tilt plane in which the tilt lever moves.

4. The device of claim 3, wherein the device comprises a plurality of tilt levers, wherein the support surfaces of the plurality of tilt levers define in combination a substantially ring-shaped surface.

5. The device of claim 1, wherein the device comprises a plurality of tilt levers, wherein each of the plurality of tilt levers comprises a segment facing a corresponding support part in relation to the corresponding pivot point, and an O-ring which contacts the segments.

6. The device of claim 1, further comprising a limit stop, which limits movement of the tilt lever from the retracted position to a maximum extended position through contact of a portion of the tilt lever with the limit stop.

7. The device of claim 1, further comprising a tensioning drive configured for connecting the tilt lever support with the pulling element, wherein one end of the tensioning drive is connected with the tilt lever support and another end of the tensioning drive is configured for connection with the pulling element.

8. A tensioning device for tensioning sections of a string sections to form a string, comprising:
a pulling element extending between a counter support and an adapter disposed at a rear end of the string,
a linear tensioning drive arranged in parallel with the string for applying a tensioning force, and
a friction brake which self-lockingly engages the pulling element in an operating position in response to a pulling load applied by the tensioning drive, so as to allow automatic movement of the tensioning device toward the pulling element,
wherein the adapter, the tensioning drive and the friction brake are formed by
a tilt lever support,
at least one tilt lever which is connected to the tilt lever support for pivoting about a pivot point, the at least one tilt lever having a support part configured for supporting the at least one tilt lever on the string section for movement from a retracted position to an extended position, wherein the retracted position is located closer to a center axis of the device than the extended position,
elastic means for biasing the tilt lever toward the extended position, and
a connection for connecting the tilt lever support with the pulling element.

9. The tensioning device of claim 8, further comprising a locking sleeve, wherein the linear tensioning drive is supported between the tilt lever support and the locking sleeve which is temporarily affixed on the pulling element.

10. The tensioning device of claim 9, wherein the pulling element comprises a plurality of rod elements with one or more openings or protrusions for positively locking with the locking sleeve of the tensioning drive.

11. The tensioning device of claim 8, wherein the counter support is implemented as at least one of a drilling device, a bursting device and expansion device.

12. The tensioning device of claim 8, wherein the linear tensioning drive comprises one or more pneumatically or hydraulically driven cylinders.

13. The tensioning device of claim 8, wherein the friction brake comprises a locking ring with an angular position, with the angular position providing a locking effect which depends on the angular position.

14. The tensioning device of claim 13, wherein the locking effect of the locking ring is deactivated by changing the angular position.

15. The tensioning device of claim 8, wherein the friction brake comprises a releasable operating lever, which in a release position allows the friction brake to move on the pulling element in the direction out of the string, while automatically locking in an opposite direction.

16. A method for tensioning string sections to form a string, comprising the steps of:
attaching a pulling element to a counter support arranged at a front end of the string;
threading one or more string sections on the pulling element;
connecting a device for connecting a string section to the pulling element, with the device comprising a tilt lever support, at least one tilt lever which is connected with the tilt lever support so as to enable the tilt lever to pivot about a pivot point, so that a support part of the tilt lever, which is formed to support the tilt lever on the string section and is biased toward an extended position by way of elastic means, is movable from a retracted position to the extended position, wherein the retracted position is arranged closer to the center axis of the device than the extended position, and a tensioning drive, so that the support part of the tilt lever is supported on the rear end of a last string section, and the tensioning drive is supported on the pulling element by a support element;
activating the tensioning drive, whereby the tilt lever support and the tilt lever move relative to the support element; and
activating a friction brake and retracting the tensioning drive from the string.

17. The method of claim 16, wherein a tensioning operation for the string comprises several tensioning cycles of the tensioning drive.

* * * * *

UNITED STATES PATENT AND TRADEMARK OFFICE
CERTIFICATE OF CORRECTION

PATENT NO. : 8,413,311 B2  
APPLICATION NO. : 12/293177  
DATED : April 9, 2013  
INVENTOR(S) : Elmar Koch Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this  
Twenty-fourth Day of June, 2014

Michelle K. Lee  
*Deputy Director of the United States Patent and Trademark Office*